Patented Mar. 1, 1938

2,109,950

UNITED STATES PATENT OFFICE 2,109,950

POWDERED PECTIN

William A. Rooker, Martinsburg, W. Va.

No Drawing. Application June 4, 1934,
Serial No. 729,029

3 Claims. (Cl. 99—132)

This invention relates to pectous materials, more particularly to a standardized powdered or dry pectin.

Pectin, or vegetable gelatin so called, is the jellifying constituent of jams, jellies and marmalades. It occurs widely in the vegetable kingdom, as for example in apples, citrus fruits, beets, carrots and the like. One of the largest and most economical sources of pectin is apple pomace or marc, the solid apple residue remaining after the expression of the apple juice.

At the present time, pectin is marketed as a concentrated liquid pectin and as a substantially pure dry product.

In marketing the dry powdered pectin, particularly in a household package, it is customary to standardize the product, that is to say, to adjust the gel strength or ability of the given weight or quantity of the product to a predetermined gel strength so that with a given quantity of material known amounts of sugar, fruit juices and/or fruit pulp may be employed and standard recipes may be used.

The necessity for standardizing arises largely from factors beyond the control of the pectin manufacturer, such as the character and degree of maturity of the fruit or vegetable which constitutes his starting material. Thus, in practice, the pectin obtained from one batch of raw material may possess a gel strength of seventy; that is, a pectin of such strength that one pound will set 70 pounds of sugar, in the presence of sufficient acid. Another batch of equal weight may produce a pectin of a gel strength of a higher or lower value. Hence, to market a product which may be employed in standard recipes, it is necessary to adjust the gel strength to a definite unit value per given mass of the material.

It has been the practice to standardize powdered pectin with sugar. While this has been effective it introduces a relatively expensive step in the process, particularly if a real attempt is made homogeneously to distribute the sugar in the pectin. Unless the sugar is wetted and subsequently dried so that the pectin is adhered to it, segregation or stratification of the sugar and pectin takes place.

I have found that pectin in the pure dry form may effectively be standardized without the use of sugar and with a material which forms a useful and advantageous component of the final jam or jelly.

An object of the present invention, therefore, is to provide a new method of standardizing pectin.

Another object is to provide a novel dry pectin product.

A further object is to standardize powdered pectin with materials available at the pectin plant.

Yet another object is to provide a dry pectin product which improves the texture of the conserve made therefrom.

With these and other equally important and related objects in view the invention comprehends the concept of standardizing powdered pectin with a material which comprises a useful component of the final gelatinized product and one which furthermore is readily available at the plant. In its more specific aspects, the invention comprises the preparation of a specially purified fruit fiber and the incorporation of this in predetermined amounts with dry powdered pectin so as to produce a standardized product.

In carrying out the present method, dry powdered pectin is first produced. This may be done in several different ways. As an example, apple pomace may be treated with cold water to remove all of the water soluble substances. After such leaching, the excess water may be removed as by pressing, centrifuging and the like. The residue may then be subjected to the action of a solvent which will remove all but the cellulosic fiber and the pectin. This may readily be done by treating with relatively dilute ethyl alcohol. Such solvent removes the undesired constituents such as tannins, fruit acids, sugars, waxes and the like.

To improve the speed and degree of extraction, the solvent may be utilized at elevated temperature.

After extraction, the mass is filtered or centrifuged to remove residual alcohol and if desired, the residue may be washed with fresh water or alcohol to completely free the pulp from traces of the solubilized constituents. The product resulting from such a treatment, then consists of purified cellulose fibers in which the fruit pectin is held.

This product is then treated to solubilize and extract the pectin. One method of accomplishing this is to treat the purified pulp with a hot acidulated aqueous solution for a period of time to solubilize the pectin. Again, the purified pulp may be heated with water alone at elevated pressure.

Thus the pectin may be brought into solution by heating the pulp with water in an autoclave under a temperature of sixty pounds of steam.

The solution produced in either case, which contains the solubilized pectin, is then separated from the pulp. This may be done by filtering in any suitable filter. The clear filtrate is then concentrated as by reduced pressure evaporation and the pectin precipitated by adding a suitable precipitant such as alcohol. The precipitated pectin is then separated from the solution and dried.

A sample of this dried product is then tested by established methods to determine its gel strength. Thereafter, it is standardized to adjust it to the particular strength desired.

The standardizing material employed in the present invention, comprises the purified depectinized fruit fibers produced during the process. The residue remaining after the pectin solubilizing treatment and filtration comprises substantially pure fruit or vegetable cellulose since it has been so treated that sugars, acids, tannins, waxes and the like as well as pectins are removed. This material is naturally a constituent of all jams, and forms a useful ingredient of any conserve since it gives a body or texture to the jelly or jam. Since it is completely deflavored and desugared, it introduces no complications either in respect to the quantity or effect of the sweetening and flavoring agents employed in the actual manufacture of the jelly or jam.

In preparing this purified pulp for use as a standardizing medium, the filter press residue is thoroughly dried and then reduced to any desired degree of fineness. If desired, the particle size may be reduced to substantially colloidal dimensions as for example by triturating the pulp in a colloid mill and then drying and fluffing the mass.

Such finely divided fiber is then added in the requisite quantity to a given mass of the pure dry pectin to bring the setting strength of any unit mass to the desired point. The two materials may homogeneously be incorporated in any suitable mixing machine.

If desired, before mixing the purified pulp, the substance may be slightly wetted and after admixture with the powdered pectin, may be dried so that the pectin is uniformly distributed through and adhered on the fibers.

It will be apparent that such a product presents an ideal material for a household package. It may be utilized for the preparation of jams, jellies and the like by incorporating it in a liquid mass containing fruit flavors and/or pulp together with the requisite quantities of acid and sugar.

It will be appreciated that the present process may be modified so as to produce standardized dry pectin having other characteristics. Thus, for example, there may be incorporated in the mass a predetermined quantity of an agent which will disperse the pectin when it is added to water to make a jam or jelly, although it is to be understood that the uniformly distributed fibers themselves insure a degree of mechanical dispersion and this facilitates the solution of the pectin. If greater dispersive characteristics are desired, the purified pulp, before final drying, may be wetted with a solution containing such a predetermined amount of sugar as will effectively disperse the pectin.

Similarly, if desired, the final standardized product may contain a predetermined amount of a suitable acid such as malic, tartaric, citric etc., so that upon making a jelly or jam from the product, it is necessary only to add the fruit juice and/or pulp and the requisite quantity of sugar. In the manner known to those skilled in the art, pulp may be impregnated with the acid so as to be uniformly distributed through the standardized mass. Likewise, other adjuvants may be included in the final product such as gas evolving compounds or other similar substances which facilitate the dissolution of the pectin in the ultimate liquid mass.

It will thus be seen that the present method insures improved and novel results. The pectin may effectively be standardized with a readily available and cheap material which material, in addition to its standardizing function, also serves as a dispersive agent for the pectin. The standardizing material forms an advantageous component of the final jelly like product and, furthermore, forms an excellent carrier material for the incorporation of sugar and/or acid in the final product.

Therefore, while a preferred modification of the invention has been described, it is to be understood that this is given merely to explain the underlying principles involved. Thus, in lieu of ethyl alcohol, any other suitable solvent may be employed, such as methyl or butyl alcohol, sulphuric ether, petroleum ether and the like. Also, the standardizing fibers may consist of citrus fruit or other fruit or vegetable fibers or any admixture of these is considered not to be limited to the particular steps and specific materials described except as such limitations are clearly imposed by the appended claims.

I claim:

1. That method of standardizing powdered pectin which comprises adding thereto a predeterminated amount of alcohol extracted depectinized purified fruit fibers together with a small amount of a pectin dispersing agent which agent is impregnated in the said fibers.

2. An article of commerce comprising a pure dry powdered pectin intimately mixed with a predetermined quantity of desugared, depectinized apple fibers which are impregnated with a predetermined quantity of an acid.

3. An article of commerce comprising a pure dry powdered pectin intimately mixed with a predetermined quantity of desugared, depectinized apple fibers, which fibers are impregnated with a predetermined quantity of a pectin dispersing agent and an acid.

WILLIAM A. ROOKER.